US011046855B2

(12) United States Patent
Nakayama et al.

(10) Patent No.: US 11,046,855 B2
(45) Date of Patent: Jun. 29, 2021

(54) LUSTERLESS PAINT AND SKIN MATERIAL

(71) Applicant: DAINICHISEIKA COLOR & CHEMICALS MFG. CO., LTD., Chuo-ku (JP)

(72) Inventors: Toru Nakayama, Kawaguchi (JP); Yoichi Matsuoka, Kawaguchi (JP); Mayo Yoshida, Saitama (JP); Masashi Oyama, Adachi-ku (JP)

(73) Assignee: DAINICHISEIKA COLOR & CHEMICALS MFG. CO., LTD., Chuo-ku (JP)

( * ) Notice: Subject to any disclaimer, the term of this patent is extended or adjusted under 35 U.S.C. 154(b) by 0 days.

(21) Appl. No.: 16/757,148

(22) PCT Filed: Oct. 19, 2018

(86) PCT No.: PCT/JP2018/038963
§ 371 (c)(1),
(2) Date: Apr. 17, 2020

(87) PCT Pub. No.: WO2019/082801
PCT Pub. Date: May 2, 2019

(65) Prior Publication Data
US 2020/0239712 A1 Jul. 30, 2020

(30) Foreign Application Priority Data
Oct. 27, 2017 (JP) .............................. JP2017-208189

(51) Int. Cl.
| C09D 7/40 | (2018.01) |
| C09D 175/04 | (2006.01) |
| C09D 7/20 | (2018.01) |
| C09D 7/42 | (2018.01) |
| C09D 5/02 | (2006.01) |

(52) U.S. Cl.
CPC .............. *C09D 7/69* (2018.01); *C09D 5/024* (2013.01); *C09D 7/20* (2018.01); *C09D 7/42* (2018.01); *C09D 175/04* (2013.01)

(58) Field of Classification Search
CPC ...................................................... C09D 7/69
See application file for complete search history.

(56) References Cited

U.S. PATENT DOCUMENTS

| 5,770,647 A | 6/1998 | Watanabe et al. |
| 2013/0171896 A1 | 7/2013 | Hanada et al. |
| 2017/0306164 A1 | 10/2017 | Jo et al. |

FOREIGN PATENT DOCUMENTS

| CA | 2 379 050 A1 | 1/2001 |
| CN | 1347944 A | 5/2002 |
| CN | 101037558 A | 9/2007 |
| CN | 103740250 A | 4/2014 |
| EP | 3 586 836 A1 | 5/2013 |
| EP | 3 505 575 A1 | 7/2019 |
| JP | 7-242839 A | 9/1995 |
| JP | 8-176491 A | 7/1996 |
| JP | 10-279844 A | 10/1998 |
| JP | 2005-138404 A | 6/2005 |
| JP | 2007-262248 A | 10/2007 |
| JP | 2012-144648 A | 8/2012 |
| JP | 2013-40259 A | 2/2013 |
| JP | 5400494 B2 | 1/2014 |
| KR | 10-2012-0108774 | 10/2012 |
| KR | 10-2013-0076586 | 7/2013 |

OTHER PUBLICATIONS

Machine translation of JP 2013-040259, published Feb. 28, 2013, << retrieved on Jul. 27, 2020 >>.*
Machine translation of JP 2005-138404, published Jun. 2, 2005, << retrieved on Jul. 27, 2020 >>.*
International Search Report dated Jan. 15, 2019 in PCT/JP2018/038963 filed Oct. 19, 2018, citing documents AA-AB and AO-AU therein, 2 pages.
English translation of Written Opinion dated Jan. 15, 2019 issued in corresponding application PCT/JP2018/038963.
Canadian Office Action dated Jun. 11, 2020 in Canadian Patent Application No. 3,079,962, citing documents AO through AQ therein, 5 pages.
Combined Chinese Office Action and Search Report dated Sep. 30, 2020 in corresponding Chinese Patent Application No. 201880069025.3 (with English Translation of Category of Cited Documents), 9 pages.

* cited by examiner

*Primary Examiner* — Vickey Nerangis
(74) *Attorney, Agent, or Firm* — Oblon, McClelland, Maier & Neustadt, L.L.P.

(57) ABSTRACT

The present invention relates to a matte coating agent containing 1 to 150 parts by mass of resin particles A having a volume average particle diameter of 1 to 5 µm, 1 to 150 parts by mass of resin particles B having a volume average particle diameter of 5 to 10 µm, and 1 to 150 parts by mass of resin particles C having a volume average particle diameter of 10 to 20 µm based on 100 parts by mass of a polyurethane resin, the total content of the resin particles A, the resin particles B, and the resin particles C being 3 to 250 parts by mass based on 100 parts by mass of the polyurethane resin, and the volume average particle diameter becoming larger sequentially from the resin particles A to the resin particles B to the resin particles C.

20 Claims, No Drawings

LUSTERLESS PAINT AND SKIN MATERIAL

TECHNICAL FIELD

The present invention relates to a matte coating agent and a skin material.

BACKGROUND ART

For the purpose of appearance improvement or protection, coating with a paint has hitherto been performed on architectural exteriors, architectural interiors, vehicle interiors, and so on. In particular, in the case of creating an external appearance with a reduced gloss or matte and a calm feeling, a matte coating agent is frequently used. In recent years, from the standpoint of environmental issue and safety, it is being contemplated to restrain the use of an organic solvent as far as possible and to convert it to an aqueous paint, and a demand for an aqueous matte coating agent is growing.

Here, as a coating method on a molded product to be coated, though there are application with a brush or a coater of every kind, gravure application, spray application, and so on, in particular, a method of molding a skin material in which a thermoplastic resin base material is applied with a matte coating agent is frequently used.

PTL 1 proposes a skin material which is suitably used as an interior material for a vehicle or the like, having no gloss and having a smooth and moist feeling imparted thereto, by using a urethane resin composition prepared by adding 100 to 250 parts by mass of spherical resin particles having an average particle diameter of 1 to 30 μm, 5 to 30 parts by mass of fine particulate silica, and 2 to 10 parts by mass of a high-molecular weight silicone oil to 100 parts by mass of a urethane resin.

CITATION LIST

Patent Literature

PTL 1: JP 2005-138404 A

SUMMARY OF INVENTION

Technical Problem

Now, in the aforementioned method of molding a skin material, an improvement of moldability becomes an issue. Then, in the aforementioned background art, it is unclear on whether or not a problem that the film is whitened or broken owing to stretching at the time of molding, and a problem that the film is broken owing to friction with a mold at the time of molding are solved.

In the light of the above, an object of the present invention is to provide a matte coating agent which is free from whitening or breakage of a film to be caused owing to stretching at time of molding and breakage of a film to be caused owing to friction with a mold at the time of molding and a skin material using the same.

Solution to Problem

The present inventors made extensive and intensive investigations. As a result, it has been found that by containing predetermined amounts of three kinds of resin particles having a different volume average particle diameter from each other in a polyurethane resin, irregularities according to the particle diameters of the resin particles are produced at the time of molding, whereby a favorable matte effect is obtained; and in view of the fact that the respective particles are complementarily existent, the aforementioned problems caused at the time of molding can be solved, thereby leading to accomplishment of the present invention. Specifically, the present invention is as follows.

[1] A matte coating agent containing 1 to 150 parts by mass of resin particles A having a volume average particle diameter of 1 to 5 μm, 1 to 150 parts by mass of resin particles B having a volume average particle diameter of 5 to 10 μm, and 1 to 150 parts by mass of resin particles C having a volume average particle diameter of 10 to 20 μm based on 100 parts by mass of a polyurethane resin, the total content of the resin particles A, the resin particles B, and the resin particles C being 3 to 250 parts by mass based on 100 parts by mass of the polyurethane resin, and the volume average particle diameter becoming larger sequentially from the resin particles A to the resin particles B to the resin particles C.

[2] The matte coating agent as set forth in [1], further containing 1 to 20 parts by mass of a silica A having a volume average particle diameter of 1 to 5 μm and 1 to 20 parts by mass of a silica B having a volume average particle diameter of 5 to 15 μm based on 100 parts by mass of the polyurethane resin, the volume average particle diameter of the silica B being larger than the volume average particle diameter of the silica A.

[3] The matte coating agent as set forth in [1] or [2], wherein the resin particles A, the resin particles B, and the resin particles C are polyurethane resin particles.

[4] The matte coating agent as set forth in any of [1] to [3], containing an aqueous solvent.

[5] A skin material including a thermoplastic resin base material provided with a film composed of the matte coating agent as set forth in any of [1] to [4].

Advantageous Effects of Invention

In accordance with the present invention, it is possible to provide a matte coating agent which is free from whitening or breakage of a film to be caused owing to stretching at time of molding and breakage of a film to be caused owing to friction with a mold at the time of molding and a skin material using the same.

DESCRIPTION OF EMBODIMENTS

[Matte Coating Agent]

The matte coating agent of the present invention is one containing 1 to 150 parts by mass of resin particles A having a volume average particle diameter of 1 to 5 μm, 1 to 150 parts by mass of resin particles B having a volume average particle diameter of 5 to 10 μm, and 1 to 150 parts by mass of resin particles C having a volume average particle diameter of 10 to 20 μm based on 100 parts by mass of a polyurethane resin. The volume average particle diameter becoming larger sequentially from the resin particles A to the resin particles B to the resin particles C. By using three kinds of the resin particles having a different volume average particle diameter from each other, it is possible to prevent whitening or breakage of a film to be caused owing to stretching at the time of molding and breakage of a film to be caused owing to friction with a mold at the time of molding from occurring.

Here, in this specification, the "film" refers to a film obtained by drying an undried "coating film" obtained by applying a matte coating agent.

As for the reason why the aforementioned effects are obtained, it may be guessed that the respective particles of the resin particles A, B, and C are complementarily existent on the surface. That is, when the film containing the foregoing resin particles are drawn by means of vacuum molding or the like, the resin particles A and B with a small particle diameter, which have sunken downward, rise to the surface, whereby irregularities according to the particle diameters of the resin particles are produced on the surface. In the case of only the resin particles C with a large particle diameter, a particle spacing is broadened owing to drawing, and therefore, breakage, such as a crack, is liable to be produced from the spacing. In addition, the matte effect is lowered in a broken site, such as a crack. In contrast, according to the matte coating agent of the present invention, it may be considered that the resin particles A and B existent in the spacings among the resin particles C rise to the surface, whereby the breakage of the film is efficiently prevented from occurring. In addition, it may be considered that since the resin particles C are large in the particle diameter, effects, such as heat resistance and scratch resistance, are readily exhibited. In the light of the above, it may be guessed that when the resin particles A, B and C complementarily exhibit the effects, respectively, the effects of the present invention are exhibited as a whole.

On molding a skin material by using the matte coating agent, a processing temperature varies depending upon a target molded product. For example, in the case of a skin material for a door trim for vehicle, the molding temperature is about 120° C., and in the case of a skin material for an instrument panel of vehicle, the molding temperature is about 170° C. Matte coating agents so far provided are blended and designed according to the processing temperature of a target molded product, and therefore, in the case of other members with a largely different processing temperature, there was an occasion that functions thereof cannot be thoroughly exhibited.

On the other hand, the matte coating agent of the present invention is also able to solve this problem by using the aforementioned three kinds of the resin particles having a different volume average particle diameter from each other.

In the matte coating agent of the present invention, from the viewpoint of thoroughly preventing whitening or breakage to be caused at the time of molding from occurring, the total amount of the resin particles A, B, and C is 3 to 250 parts by mass based on 100 parts by mass of the polyurethane resin. When the foregoing total amount is less than 3 parts by mass, the sufficient effects owing to the resin particles A, B, and C are not obtained, whereas when it is more than 250 parts by mass, a proportion of the resin particles A, B, and C relative to the polyurethane resin becomes high, and moldability is lowered.

Each of the components which are used in the present invention is hereunder described in more detail.

<Resin Particles>

The volume average particle diameter of the resin particles A is preferably 1.5 to 4.5 μm, and more preferably 2 to 4 μm. The volume average particle diameter as referred to in this specification can be determined from a 50% cumulative average value as measured by using Microtrac UPA (manufactured by Nikkiso Co., Ltd.).

The content of the resin particles A is preferably 3 to 100 parts by mass, and more preferably 4 to 70 parts by mass based on 100 parts by mass of the polyurethane resin.

The average particle diameter of the resin particles B is preferably 6 to 9 μm, and more preferably 6 to 8 μm.

The content of the resin particles B is preferably 3 to 100 parts by mass, and more preferably 4 to 70 parts by mass based on 100 parts by mass of the polyurethane resin.

The average particle diameter of the resin particles C is preferably 12 to 18 μm, and more preferably 13 to 17 μm.

The content of the resin particles C is preferably 3 to 100 parts by mass, and more preferably 4 to 70 parts by mass based on 100 parts by mass of the polyurethane resin.

Although the total amount of the resin particles A, B, and C is 3 to 250 parts by mass based on 100 parts by mass of the polyurethane resin, it is preferably 9 to 200 parts by mass, and more preferably 15 to 170 parts by mass.

A ratio ($D_A/D_B$) of a volume average particle diameter ($D_A$) of the resin particles A to a volume average particle diameter ($D_B$) of the resin particles B is preferably 0.22 to 0.67. When the $D_A/D_B$ is 0.22 to 0.67, a lowering of the matte effect in a site drawn by molding can be prevented from occurring, and soft-feel properties can be imparted.

A ratio ($D_B/D_C$) of the volume average particle diameter ($D_B$) of the resin particles B to a volume average particle diameter ($D_C$) of the resin particles C is preferably 0.33 to 0.75. When the $D_B/D_C$ is 0.33 to 0.75, scratch resistance can be imparted.

A ratio $D_C/T$ of the volume average particle diameter ($D_C$) of the resin particles C to a thickness (T) of the film composed of the matte coating agent is preferably 0.8 to 6. When the $D_C/T$ falls within the foregoing range, a proportion of rise of the resin particles A and the resin particles B to the surface after drawing can be increased. The aforementioned dry thickness refers to a thickness after applying the matte coating agent on a base material or the like and then drying. In general, after drying, a molding treatment or the like is performed.

The thickness of the film is preferably 0.1 to 100 μm, and especially preferably 1 to 50 μm.

From the viewpoint of obtaining a soft touch feeling on forming a skin material, as for the resin particles A, B, and C, a resin having a glass transition point (Tg) of 5° C. or lower is preferred, and a resin having a glass transition point of −60 to −5° C. is more preferred. The Tg is expressed in terms of a measured value by a thermomechanical analysis (TMA).

Similarly, from the viewpoint of obtaining a soft touch feeling on forming a skin material, a compressive strength is preferably 0.01 to 2.0 MPa, and more preferably 0.01 to 1.0 MPa.

In the case of subjecting the resin particles to a compression test with a microcompression testing machine MCT-W500, manufactured by Shimadzu Corporation, the compressive strength as referred to herein is a value calculated from a load and a particle diameter when deformed at a ratio of 10% relative to the particle diameter, according to the formula: [{compressive strength (MPa)}=2.8×load (N)/{π×{particle diameter (mm)}×{particle diameter (mm)}}].

Examples of the resin particles A, B, and C of the present invention include resin particles of a urethane resin, an acrylic resin, a urea resin, or the like. As for these resin particles, two or more thereof may be made of the same material, or they may be made of a different material from each other. Above all, a urethane resin is preferred from the standpoint that a favorable touch feeling is obtained, and it is more preferred that the resin particles A, B and C are each made of a urethane resin (urethane resin particles).

Examples of the urethane resin include a urethane resin obtained by chain extension reaction with a polyurethane which is obtained through a reaction of a polyol and a polyisocyanate with a low-molecular weight compound having two or more active hydrogens, such as a diol, a diamine, and a dicarboxylic acid; and a urethane resin obtained through a reaction of an acidic group-containing polyol and a polyisocyanate.

As the resin particles made of a urethane resin, for example, DAIMICBEAZ (manufactured by Dainichiseika Color & Chemicals Mfg. Co., Ltd.), ART-PEARL (manufactured by Negami Chemical Industrial Co., Ltd.), and the like can be used.

<Polyurethane Resin>

As the polyurethane resin according to the present invention, known polyurethane resins which are used for paints can be used. The polyurethane resin according to the present invention is obtained from a high-molecular weight polyol and a polyisocyanate, and a chain extender, such a short-chain diol and a short-chain diamine, is used as the need arises. In addition, in the case of providing an aqueous paint, a compound further having one or more active hydrogen groups and also having a hydrophilic group is occasionally used. Furthermore, on subjecting the polyurethane resin to polysiloxane-modification, a polysiloxane compound is occasionally used.

(High-Molecular Weight Polyol)

As the high-molecular weight polyol, the following are exemplified.

(1) Polycarbonate Diol

Examples of polycarbonate polyols include polytetramethylene carbonate diol, polypentamethylene carbonate diol, polyneopentyl carbonate diol, polyhexamethylene carbonate diol, poly(l,4-cyclohexanedimethylene carbonate) diol, and random/block copolymers thereof.

(2) Polyether Polyol

Examples of polyether polyols include those obtained through polymerization or copolymerization of any of an alkylene oxide (e.g., ethylene oxide, propylene oxide, and butylene oxide) and a heterocyclic ether (e.g., tetrahydrofuran). Specifically, examples thereof include polyethylene glycol, polypropylene glycol, polyethylene glycol-polytetramethylene glycol (block or random), polytetramethylene ether glycol, and polyhexamethylene glycol.

(3) Polyester Polyol

Examples of polyester polyols include those obtained through polycondensation of at least one of an aliphatic dicarboxylic acid (for example, succinic acid, adipic acid, sebacic acid, glutaric acid, and azelaic acid) and an aromatic dicarboxylic acid (for example, isophthalic acid and terephthalic acid), with a low-molecular weight glycol (for example, ethylene glycol, 1,2-propylene glycol, 1,3-propylene glycol, 1,3-butylene glycol, 1,4-butylene glycol, 1,6-hexamethylene glycol, neopentyl glycol, and 1,4-bishydroxymethylcyclohexane).

Specifically, examples thereof include polyethylene adipate diol, polybutylene adipate diol, polyhexamethylene adipate diol, polyneopentyl adipate diol, polyethylene/butylene adipate diol, polyneopentyl/hexyl adipate diol, poly-3-methylpentane adipate diol, and polybutylene isophthalate diol.

(4) Polylactone Polyol

Examples of polylactone polyols include polycaprolactone diol and poly-3-methylvalerolactone diol.

(5) Polyolefin Polyol

Examples of polyolefin polyols include polybutadiene glycol and polyisoprene glycol, or hydrides thereof.

(6) Polymethacrylate Diol

Examples of polymethacrylate diols include α,ω-polymethyl methacrylate diol and α,ω-polybutyl methacrylate diol.

Although such a high-molecular weight polyol is not particularly limited with respect the structure and molecular weight thereof, in general, its number average molecular weight is preferably about 500 to 4,000. Although the high-molecular weight polyol can be used alone or in combination of two or more thereof, from the viewpoint of long-term durability, it is preferred to include a polycarbonate diol.

The number average molecular weight is a number average molecular weight as expressed in terms of polystyrene, and in general, it can be determined by means of measurement of gel permeation chromatography (GPC).

(Polyisocyanate)

Examples of the polyisocyanate compound include aromatic diisocyanates, such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 4,4'-methylenebis(phenylene isocyanate) (MDI), durylene diisocyanate, tolylene diisocyanate, xylylene diisocyanate (XDI), 1,5-naphthalene diisocyanate, benzidine diisocyanate, o-nitrobenzidine diisocyanate, and 4,4'-diisocyanate dibenzyl; aliphatic diisocyanates, such as methylene diisocyanate, 1,4-tetramethylene diisocyanate, 1,6-hexamethylene diisocyanate, and 1,10-decamethylene diisocyanate; alicyclic diisocyanates, such as 1,4-cyclohexylene diisocyanate, 4,4'-methylenebis(cyclohexyl isocyanate), 1,5-tetrahydronaphthalene diisocyanate, isophorone diisocyanate, hydrogenated MDI, and hydrogenated XDI; and polyurethane prepolymers obtained by allowing such a diisocyanate compound to react with a low-molecular weight polyol or polyamine such that the end thereof is an isocyanate.

(Short-Chain Diol)

The short-chain diol is a compound having a number average molecular weight of less than 500. Examples thereof include compounds, such as aliphatic glycols, e.g., ethylene glycol, 1,2-propylene glycol, 1,3-propylene glycol, 1,3-butylene glycol, 1,4-butylene glycol, 1,6-hexamethylene glycol, and neopentyl glycol, and alkylene oxide low-molar adducts thereof (number average molecular weight: less than 500); alicyclic glycols, e.g., 1,4-bishydroxymethyl cyclohexane and 2-methyl-1,1-cyclohexane dimethanol, and alkylene oxide low-molar adducts thereof (number average molecular weight: less than 500); aromatic glycols, such as xylylene glycol, and alkylene oxide low-molar adducts thereof (number average molecular weight: less than 500); bisphenols, such as bisphenol A, thiobisphenol, sulfone bisphenol, and alkylene oxide low-molar adducts thereof (number average molecular weight: less than 500); and alkyl dialkanolamines, e.g., a C1-C18 alkyl diethanolamine.

(Short-Chain Diamine)

Examples of the short-chain diamine include aliphatic diamine compounds, such as ethylenediamine, trimethylenediamine, hexamethylenediamine, and octamethylenediamine; aromatic diamine compounds, such as phenylenediamine, 3, 3'-dichloro-4,4'-diaminodiphenylmethane, 4,4'-methylenebis(phenylamine), 4,4'-diaminodiphenyl ether, and 4,4'-diaminodiphenylsulfone; alicyclic diamine compounds, such as cyclopentanediamine, cyclohexyldiamine, 4,4-diaminodicyclohexylmethane, 1,4-diaminocyclohexane, and isophoronediamine; and hydrazines, such as hydrazine, carbodihydrazide, adipic dihydrazide, sebacic dihydrazide, and phthalic dihydrazide.

(Compound Having One or More Active Hydrogens and also Having Hydrophilic Group)

As the compound having one or more active hydrogens and also having a hydrophilic group, known compounds which are used as a component capable of imparting water dispersibility of the polyurethane aqueous dispersion can be used.

In the foregoing compound, the active hydrogen refers to a hydrogen atom which reacts with the isocyanate group of the polyisocyanate, and examples thereof include a hydrogen atom of a hydroxy group, a mercapto group, an amino group, or the like. Of these, a hydrogen atom of a hydroxy group is preferred. In addition, the hydrophilic group is a functional group for the purpose of imparting water dispersibility. Although the hydrophilic group may be either anionic or cationic, it is preferably anionic. Examples of the anionic hydrophilic group include a carboxy group, a sulfo group, and a phosphate group, and of these, a carboxy group is preferred.

As the compound in which the hydrophilic group is anionic, those having a hydrophilic group, such as a sulfonic acid-based compound, a carboxylic acid-based compound, and a phosphoric acid-based compound, can be used, and examples thereof include carboxylic acid compounds, such as dimethylolpropionic acid, dimethylolbutanoic acid, lactic acid, and glycine; and sulfonic acid compounds, such as taurine and a sulfoisophthalic acid-based polyester diol.

Of these, carboxylic acid compounds of a dihydric alcohol, especially dimethylolalkanoic acids, such as dimethylolpropionic acid and dimethylolbutanoic acid, are preferably used.

The hydrophilic group may be neutralized with a neutralizing agent, to convert to a salt. Examples of the neutralizing agent with respect to the anionic hydrophilic group include organic amines, for example, alkylamines, such as ethylamine, trimethylamine, triethylamine, triisopropylamine, and tributylamine, and alkanolamines, such as triethanolamine, N-methyldiethanolamine, N-phenyldiethanolamine, monoethanolamine, dimethylethanolamine, diethylethanolamine, and 2-amino-2-ethyl-1-propanol; and alkali metal hydroxides, such as lithium hydroxide, sodium hydroxide, and potassium hydroxide. Of these, a tertiary alkylamine, such as triethylamine, sodium hydroxide, and a tertiary alkanolamine, such as dimethylaminoethanol, are preferred.

(Polysiloxane Compound)

The polysiloxane compound is used on the occasion of subjecting the polyurethane resin to polysiloxane-modification. By undergoing the polysiloxane-modification, scratch resistance can be improved. As the polysiloxane compound, those having the following structures can be used.

(1) Amino-Modified Polysiloxane

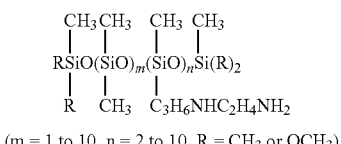

(m = 1 to 10, n = 2 to 10, R = $CH_3$ or $OCH_3$)

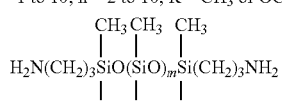

(m = 0 to 200)

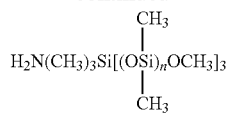

(n = 2 to 10)

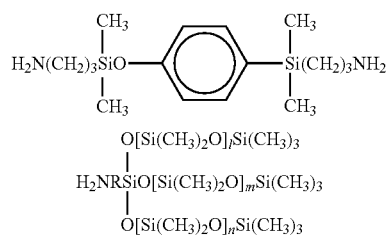

(branch point=2 to 3, R=lower alkyl group, l=2 to 200, m=2 to 200, n=2 to 200)

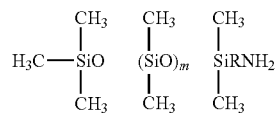

(m = 1 to 200, R = lower alkyl group)

(2) Epoxy-Modified Polysiloxane

An epoxy compound can be used through a reaction with a polyol, a polyamide, a polycarboxylic acid, or the like, to have terminal active hydrogen.

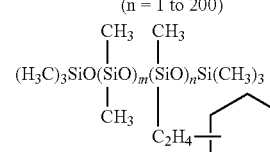

(n = 1 to 200)

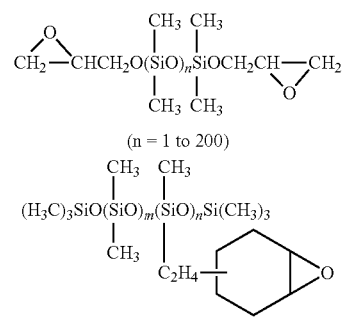

(m = 1 to 10, n = 2 to 10)

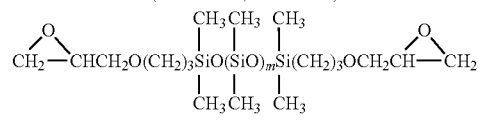

(m = 1 to 200)

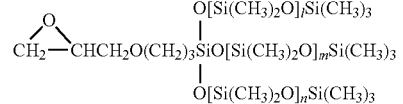

(branch point = 2 to 3, l = 2 to 200, m = 2 to 200, n = 2 to 200)

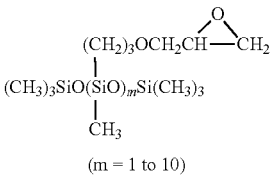

(m = 1 to 10)

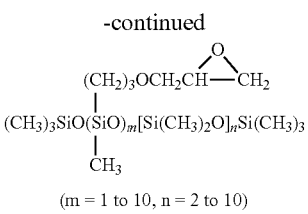

(m = 1 to 10, n = 2 to 10)

(3) Alcohol-Modified Polysiloxane

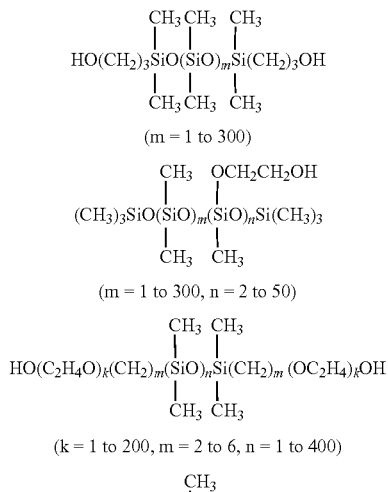

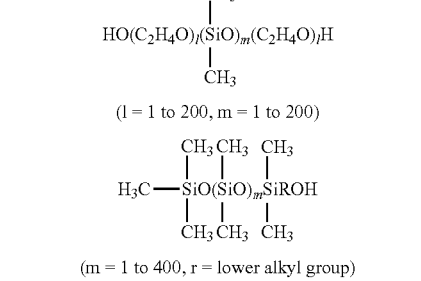

(R = CH₃ or OCH₃, R' = hydrogen atom or alkyl group, k = 1 to 250, l = 0 to 5, m = 0 to 50, n = 1 to 3)

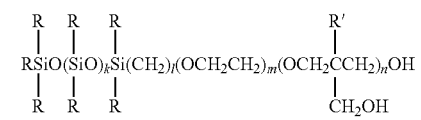

(R = CH₃ or OCH₃, k = 1 to 250, l = 0 to 5, m = 0 to 50, n = 1 to 3)

(4) Mercapto-Modified Polysiloxane

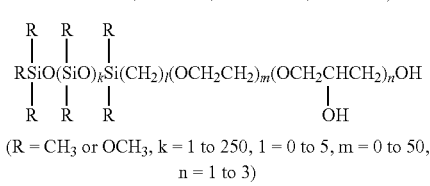

(m = 1 to 20, n = 2 to 100)

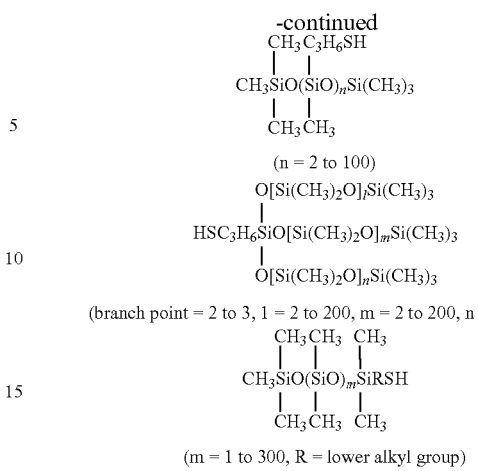

The aforementioned siloxane-modified polyols are one example of the preferred compound, and it should be construed that the present invention is not limited to these exemplified compounds. Among those described above, the alcohol-modified polysiloxane is preferred.

The foregoing are exemplifications of the preferred components, and it should be construed that the present invention is not limited thereto. Accordingly, not only the above-exemplified components but also any compounds which are marketed at present and readily commercially available compounds can be used.

In addition, an epoxy resin, a polyvinyl chloride, or the like can also be used in combination with the polyurethane resin within a range where the effects of the present invention are not affected.

(Production Method of Polyurethane Resin)

A production method of the polyurethane resin according to the present invention is not particularly limited, and a conventionally known production method of polyurethane can be adopted. For example, the high-molecular weight polyol and the polyisocyanate and optionally, the chain extender, such as a short-chain diol and a short-chain diamine are allowed to react with each other by means of blending such that an equivalent ratio of the isocyanate group and the active hydrogen-containing group (e.g., a hydroxy group) is typically 1.0 or before and after thereof (0.9 to 1.1), at 20 to 150° C. (preferably 60 to 110° C.) by a one-shot method or a multi-stage method until the product reaches a theoretical NCO %. In addition, the polyurethane resin can also be produced by emulsifying the formed resin with water and a neutralizing agent, followed by performing a desolvation process, if desired.

In the aforementioned urethane synthesis, a catalyst can be used, as the need arises. Examples of the catalyst include salts of a metal and an organic or inorganic acid, such as dibutyltin laurate, dioctylthin laurate, stannous octoate, lead octylate, and tetra-n-butyl titanate, and organometallic derivatives, and organic amines, such as triethylamine, and diazabicycloundecene-based catalysts.

The polyurethane resin may be synthesized in the absence of a solvent, or may also be synthesized in the presence of an organic solvent, as the need arises. Examples of a solvent which is preferred as the organic solvent include those which are inert to the isocyanate group or lower in activity than the reaction components. Examples thereof include ketone-based solvents (e.g., acetone, methyl ethyl ketone, methyl isobutyl ketone, and cyclohexanone), aromatic hydrocarbon solvents (e.g., toluene, xylene, SWASOL (an aromatic hydrocarbon solvent, manufactured by Cosmo Oil Co., Ltd.), and SOLVESSO (an aromatic hydrocarbon solvent, manufactured by Exxon Chemical Company)), aliphatic hydrocarbon solvents (e.g., n-hexane), alcohol-based solvents (e.g., methyl alcohol, ethyl alcohol, and isopropyl alcohol), ether-based solvents (e.g., dioxane and tetrahydrofuran), ester-based solvents (e.g., ethyl acetate, butyl acetate, and isobutyl acetate), glycol ether ester-based solvents (e.g., ethylene glycol ethyl ether acetate, propylene glycol methyl ether acetate, 3-methyl-3-methoxybutyl acetate, and ethyl-3-ethoxypropionate), amide-based solvents (e.g., dimethyl formamide and dimethyl acetamide), and lactam-based solvents (e.g., N-methyl-2-pyrrolidone). Of these, methyl ethyl ketone, ethyl acetate, acetone, tetrahydrofuran, and so on are preferred taking into consideration solvent recovery, solubility at the time of urethane synthesis, reactivity, boiling point, and emulsification dispersibility in water.

During producing the polyurethane resin, an additive may be added, if desired. Examples thereof include an antioxidant (e.g., a hindered phenol-based antioxidant, a phosphite-based antioxidant, and a thioether-based antioxidant), a photostabilizer (e.g., a hindered amine-based photostabilizer), a UV absorber (e.g., a benzophenone-based UV absorber and a benzotriazole-based UV absorber), a gas discoloration stabilizer (e.g., a hydrazine-based gas discoloration stabilizer), and a metal deactivator, and also a combination of two or more thereof.

As the polyurethane resin, commercially available products can also be used. Examples thereof include RESAMINE D-6022SP (manufactured by Dainichiseika Color & Chemicals Mfg. Co., Ltd.).

<Silica>

The matte coating agent of the present invention preferably contains 1 to 20 parts by mass of silica A having a volume average particle diameter of 1 to 5 μm and 1 to 20 parts by mass of silica B having a volume average particle diameter of 5 to 15 μm. When the matte coating agent contains 1 to 20 parts by mass of the silica A, the matte effect can be obtained. The content of the silica A is preferably 1.5 to 12 parts by mass. In addition, when the matte coating agent contains 1 to 20 parts by mass of the silica B, the matte effect and wear resistance can be improved. The content of the silica B is preferably 1.5 to 12 parts by mass. The volume average particle diameter of the silica B is larger than the volume average particle diameter of the silica A.

Furthermore, a mass ratio of the silica A to the silica B [(silica A)/(silica B)] is preferably 0.5/10 to 10/0.5, and more preferably 1/10 to 10/1. When the mass ratio [(silica A)/(silica B)] is 0.5/10 to 10/0.5, a lowering of the matte effect in a site drawn by molding can be prevented from occurring.

Although the silica according to the present invention is not particularly limited to any of a natural product and a synthetic product, so far as the synthetic product is concerned, examples thereof include precipitated silica, gel-process silica, and fumed silica. Above all, precipitated silica and fumed silica are preferred. The silica A and the silica B may be made of the same kind or a different kind from each other. For example, the silica A may be made of precipitated silica, and the silica B may be made of fumed silica.

<Crosslinking Agent>

By adding a crosslinking agent to the matte coating agent of the present invention, a film with more improved durability can be obtained. As the crosslinking agent, conventionally known crosslinking agents, such as an oxazoline compound, an aqueous epoxy compound, an aqueous carbodiimide compound, an aziridine compound, an aqueous isocyanate compound, and a metal complex-based crosslinking agent, can be used. Of these crosslinking agents, an epoxy compound, a carbodiimide compound, an aziridine compound, an oxazoline compound, and an isocyanate compound are preferred. Examples of a commercially available product of the epoxy compound which can be used as the crosslinking agent include "JER" (manufactured by Mitsubishi Chemical Corporation). Examples of a commercially available product of the carbodiimide compound include "CARBODILITE" (manufactured by Nisshinbo Chemical Inc.). Examples of a commercially available product of the aziridine compound include "CHEMITITE" (manufactured by Nippon Shokubai Co., Ltd.). Examples of a commercially available product of the oxazoline compound include "EPOCROS" (manufactured by Nippon Shokubai Co., Ltd.). Examples of a commercially available product of the isocyanate compound include "DURANATE" (manufactured by Asahi Kasei Chemicals Corporation).

So far as the crosslinking agent is used in a moderate amount, such is effective for an improvement in heat resistance or weather resistance. However, when the use amount of the crosslinking agent is in excess, a fault, such as embrittlement of the film and plasticization due to the unreacted crosslinking agent is occasionally caused. For this reason, the use amount of the crosslinking agent is controlled to preferably 40 parts by mass or less, and more preferably 0.5 to 20 parts by mass as expressed in terms of the solid content of the crosslinking agent based on 100 parts by mass of the polyurethane resin.

<Solvent>

In the present invention, a solvent may be mixed for the purpose of regulating the viscosity, or the like. As the solvent, water is preferred from the standpoint of environment.

<Additive>

To the matte coating agent of the present invention, a crosslinking agent, a slipping agent, a pigment, a silane coupling agent, and so on can be added within a range where the effects of the present invention are not affected.

It is preferred that the matte coating agent of the present invention contains an aqueous solvent. The matte coating agent of the present invention can be prepared by essentially containing the polyurethane resin and the resin particles A, B, and C and blending therein the silica, the crosslinking agent, and the like more preferably in an aqueous solvent (aqueous medium), and still more preferably in ion-exchanged water. A solid content concentration in the matte coating agent of the present invention is preferably 10 to 50% by mass, and preferably 20 to 40% by mass. When the foregoing solid content concentration is 10 to 50% by mass, a film having a desired thickness can be efficiently formed.

[Skin Material]

The skin material of the present invention includes a thermoplastic resin base material provided with a film composed of the matte coating agent of the present invention. Examples of the thermoplastic resin base material include an olefin-based resin, such as a polyethylene-based resin, a polypropylene-based resin, and a thermoplastic polyolefin, an ethylene propylene diene-based resin, a styrene acrylonitrile-based resin, a polysulfone-based resin, a polyphenylene ether-based resin, an acrylic resin, a silicone-based resin, a fluorine-based resin, a polyester-based resin, a polyamide-based resin, a polyimide-based resin, a polystyrene-based resin, a polyurethane-based resin, a polycarbonate-based resin, a norbornene-based resin, a cellulose-based resin, a polyvinyl alcohol-based resin, a polyvinyl formal-based resin, a polyvinyl butyral-based resin, a polyvinylpyrrolidone-based resin, a polyvinyl acetal-based resin, a polyvinyl acetate-based resin, a vinyl chloride resin, an engineering plastic, and a biodegradable plastic.

In particular, there are exemplified a thermoplastic polyolefin, a polyurethane, and a polypropylene, which are used as an interior material for automobile. For example, in the case of a TPO (olefin-based thermoplastic elastomer) base material sheet that is the thermoplastic polyolefin, a two-pack type aqueous urethane-based resin is applied on a corona discharge-treated TPO base material sheet, and the matte coating agent of the present invention is further applied thereon by means of spray application or gravure application, to form a coating film. Thereafter, the coating film is dried at 80 to 120° C. for 1 to 3 minutes to form a film and then subjected to a molding treatment at 160 to 220° C., to prepare a skin material (instrument panel for automobile).

cal Industrial Co., Ltd., volume average particle diameter: 6 μm, Tg: −13° C.), polyurethane gel particles C ("ART-PEARL C-400 TRANSPARENT", manufactured by Negami Chemical Industrial Co., Ltd., volume average particle diameter: 15 μm, Tg: −13° C.), a silica A ("NIPSIL E-220A", manufactured by Tosoh Silica Corporation, volume average particle diameter: 1.7 μm), a silica B ("ACEMATTTS-100", manufactured by Evonik Industries AG, volume average particle diameter: 9.5 μm), and an aqueous crosslinking agent ("CARBODILITE V-04", manufactured by Nisshinbo Chemical Inc. non-volatile matter content=40%) were blended in a proportion shown in the following Table 1 in ion-exchanged water, thereby preparing paints of Examples 1 to 7 and Comparative Examples 1 to 5 each having a solid content of 35% by mass.

TABLE 1

| | Example | | | | | | | Comparative Example | | | | |
|---|---|---|---|---|---|---|---|---|---|---|---|---|
| | 1 | 2 | 3 | 4 | 5 | 6 | 7 | 1 | 2 | 3 | 4 | 5 |
| Polyurethane resin | 100 | 100 | 100 | 100 | 100 | 100 | 100 | 100 | 100 | 100 | 100 | 100 |
| Polyurethane gel particles A | 12 | 6 | 6 | 18 | 12 | 12 | 60 | — | 18 | 15 | 70 | — |
| Polyurethane gel particles B | 12 | 18 | 6 | 6 | 12 | 12 | 60 | 24 | — | 15 | — | — |
| Polyurethane gel particles C | 6 | 6 | 18 | 6 | 6 | 6 | 30 | 6 | 12 | — | — | 50 |
| Silica A | 6 | 6 | 6 | 6 | 2 | 10 | — | 6 | 6 | 6 | — | — |
| Silica B | 6 | 6 | 6 | 6 | 10 | 2 | — | 6 | 6 | 6 | 10 | 18 |
| Aqueous crosslinking agent | 10 | 10 | 10 | 10 | 10 | 10 | 10 | 10 | 10 | 10 | 10 | 10 |
| Ion-exchanged water | Moderate amount | Moderate amount | Moderate amount | Moderate amount | Moderate amount | Moderate amount | Moderate amount | Moderate amount | Moderate amount | Moderate amount | Moderate amount | Moderate amount |

In the case where the matte coating agent of the present invention is applied on a thermoplastic resin base material with poor adhesiveness, in order to enhance adhesion to the paint, its surface may be subjected to a corona discharge treatment or a primer treatment.

Here, examples of the molding treatment include vacuum molding and press molding. In particular, by performing vacuum molding, a skin material of an instrument panel or door trim for automobile can be provided. The film composed of the matte coating agent of the present invention is stretched entirely or locally by means of a molding treatment. However, as already mentioned, whitening or breakage of a film to be caused owing to stretching at time of molding and breakage of a film to be caused owing to friction with a mold at the time of molding can be prevented from occurring.

EXAMPLES

The present invention is hereunder more specifically described by reference to Examples and Comparative Examples, but it should be construed that the present invention is not limited thereto. In addition, in the following description, the term "part" expresses a part by mass, and the term "%" expresses mass %.

A polyurethane-based resin ("RESAMINE D-6022SP", manufactured by Dainichiseika Color & Chemicals Mfg. Co., Ltd., a polysiloxane-modified polycarbonate-based polyurethane dispersion, non-volatile matter content=40%), polyurethane gel particles A ("ART-PEARL C-1000 TRANSPARENT", manufactured by Negami Chemical Industrial Co., Ltd., volume average particle diameter: 3 μm, Tg: −13° C.), polyurethane gel particles B ("ART-PEARL C-800 TRANSPARENT", manufactured by Negami Chemi- Evaluation Examples On an olefin-based thermoplastic elastomer (TPO) sheet having a hardness (JIS-A) of 75, which had been surface-modified (50 mN/m) by a corona treatment, the following primer composition was subjected to spray application and then dried at 90° C. for 90 seconds to obtain a sheet, and each of the paints of Examples 1 to 7 and Comparative Examples 1 to 5 was then subjected to spray application thereon, followed by drying at 90° C. for 90 seconds to obtain a painted sheet (dry thickness: 8 μm). On the resulting sheet, a geometric tone pattern was applied with an embossed (patterned) emboss roll heated at 220° C., and various evaluation tests were performed. The results are shown in Table 2.

Primer Composition

Non-silicone-modified polyurethane dispersion: 100 parts ("RESAMINE D-6028", manufactured by Dainichiseika Color & Chemicals Mfg. Co., Ltd., non-volatile matter content=40%)

Water dispersion type isocyanate: 5 parts ("WT20-100", manufactured by Asahi Kasei Chemicals Corporation, non-volatile matter content=100%)

Ion-exchanged water: 345 parts

The evaluation methods and evaluation criteria are as follows.

<60° Glossiness>

Using a direct reading haze computer HGM-2DP, manufactured by Suga Test Instruments Co., Ltd., the glossiness [(60° incident light)/(60° reflected light)] of each of the test sheets was measured. As an interior material for automobile, it is preferred that the glossiness is 1.2 or less.

<Scratch Resistance Test>

The film of each of the test sheets was rubbed 100 times under a load of about 1 kg/cm$^2$ by using Scotch-Brite (manufactured by Sumitomo 3M Limited), thereby visually confirming any scratches on the surface.

A: The number of scratches which can be confirmed is 0 or more and less than 5.

B: The number of scratches which can be confirmed is 5 or more and less than 10.

C: The number of scratches which can be confirmed is 10 or more.

<Soft-Feel Properties>

The film surface of each of the test sheets was touched with fingers, and the soft-feel properties were evaluated from the obtained touch feeling.

A: Touch feeling with elasticity and silkiness

B: Touch feeling that is slightly less elastic but gripping and rough

C: Touch feeling without elasticity but rustling

<Vacuum Moldability Test>

Each of the test sheets was heated to a surface temperature of 120° C. or 160° C., and then, the surface of the test piece before and after molding at a development rate of 300% was observed through visual inspection and with a digital scope (magnification: 100 times), thereby confirming the presence or absence of any poor appearance (e.g., change of embossed, whitening, and crack).

In addition, a change of the 60° glossiness before and after molding at a development rate of 300% was confirmed at 120° C. and 160° C., respectively.

Criteria of Appearance Evaluation

A: No poor appearance

B: Occurrence of slight change of embossed, whitening, and crack

C: Occurrence of remarkable change of embossed, whitening, and crack

Criteria of Change of 60° Glossiness

5: A change of 60° glossiness is less than 30%.

4: A change of 60° glossiness is 30% or more and less than 60%.

3: A change of 60° glossiness is 60% or more and less than 90%.

2: A change of 60° glossiness is 90% or more and less than 120%.

1: A change of 60° glossiness is 120% or more.

<Heat Resistance Test>

Each of the test sheets was subjected to a heat resistance test in an oven under a test condition at 120° C. for 400 hours, thereby confirming an appearance change of the film.

In addition, a change of 60° glossiness before and after the heat resistance test was confirmed.

Criteria of Appearance Evaluation

A: Yellowing, choking, and crack/chap are not observed.

B: Slight yellowing, choking, and crack/chap are observed.

C: Remarkable yellowing, choking, and crack/chap are observed.

Criteria of Change of 60° Glossiness

5: A change of 60° glossiness is less than 30%.

4: A change of 60° glossiness is 30% or more and less than 60%.

3: A change of 60° glossiness is 60% or more and less than 90%.

2: A change of 60° glossiness is 90% or more and less than 120%.

1: A change of 60° glossiness is 120% or more.

<Weather Resistance Test>

Each of the test sheets was subjected to a weather resistance promotion test with a xenon weather-o-meter, thereby confirming an appearance change of the film.

In addition, a change of the 60° glossiness before and after the weather resistance test was confirmed.

Weather resistance test condition: The irradiation with a xenon weather-o-meter was performed under an irradiation condition at an illumination of 50 to 150 w/m$^2$ (at 300 to 400 nm) and a black panel temperature of 90° C. for an irradiation time of 8 weeks (2,000 kj).

Criteria of Appearance Evaluation

A: Discoloration, whitening, crack, etc. are not observed.

B: Slight discoloration, whitening, crack, etc. are observed.

C: Remarkable discoloration, whitening, crack, etc. are observed.

Criteria of Change of 60° Glossiness

5: A change of 60° glossiness is less than 30%.

4: A change of 60° glossiness is 30% or more and less than 60%.

3: A change of 60° glossiness is 60% or more and less than 90%.

2: A change of 60° glossiness is 90% or more and less than 120%.

1: A change of 60° glossiness is 120% or more.

<Hydrolysis Resistance Test>

Each of the test sheets was subjected to a jungle test (at a temperature of 70° C. and a relative humidity of 95% for 8 weeks), thereby confirming an appearance change of the film.

In addition, a change of the 60° glossiness before and after the hydrolysis resistance test was confirmed.

Criteria of Appearance Evaluation

A: Discoloration, whitening, crack, etc. are not observed.

B: Slight discoloration, whitening, crack, etc. are observed.

C: Remarkable discoloration, whitening, crack, etc. are observed.

Criteria of Change of 60° Glossiness

5: A change of 60° glossiness is less than 30%

4: A change of 60° glossiness is 30% or more and less than 60%.

3: A change of 60° glossiness is 60% or more and less than 90%.

2: A change of 60° glossiness is 90% or more and less than 120%.

1: A change of 60° glossiness is 120% or more.

TABLE 2

|  |  | Example |  |  |  |  |  |  | Comparative Example |  |  |  |  |
|---|---|---|---|---|---|---|---|---|---|---|---|---|---|
|  |  | 1 | 2 | 3 | 4 | 5 | 6 | 7 | 1 | 2 | 3 | 4 | 5 |
| 60° glossiness |  | 1.0 | 1.1 | 1.2 | 0.9 | 0.8 | 1.2 | 0.7 | 1.2 | 1.0 | 1.0 | 0.9 | 1.0 |
| Scratch resistance |  | A | A | A | A | A | A | A | A | A | B | B | A |
| Soft-feel properties |  | A | A | A | A | A | A | A | A | B | A | B | C |
| Vacuum moldability at 120° C. | Appearance | A | A | A | A | A | A | A | A | A | A | A | B |
|  | Change of 60° glossiness | 5 | 4 | 4 | 4 | 5 | 4 | 4 | 2 | 4 | 3 | 3 | 4 |

TABLE 2-continued

|  |  | Example | | | | | | | Comparative Example | | | | |
| --- | --- | --- | --- | --- | --- | --- | --- | --- | --- | --- | --- | --- | --- |
|  |  | 1 | 2 | 3 | 4 | 5 | 6 | 7 | 1 | 2 | 3 | 4 | 5 |
| Vacuum moldability at 160° C. | Appearance | A | A | A | A | A | A | A | A | A | A | A | A |
|  | Change of 60° glossiness | 5 | 4 | 4 | 5 | 5 | 5 | 4 | 3 | 5 | 4 | 4 | 5 |
| Heat resistance | Appearance | A | A | A | A | A | A | A | A | A | A | A | A |
|  | Change of 60° glossiness | 5 | 5 | 5 | 5 | 5 | 4 | 5 | 5 | 5 | 3 | 3 | 5 |
| Weather resistance | Appearance | A | A | A | A | A | A | A | A | A | A | A | C |
|  | Change of 60° glossiness | 5 | 5 | 5 | 4 | 4 | 5 | 4 | 4 | 4 | 4 | 2 | 2 |
| Hydrolysis resistance | Appearance | A | A | A | A | A | A | A | A | A | A | A | A |
|  | Change of 60° glossiness | 5 | 5 | 5 | 4 | 5 | 4 | 4 | 4 | 3 | 4 | 1 | 2 |

INDUSTRIAL APPLICABILITY

The matte coating agent of the present invention is utilizable as a designability-imparting paint particularly for architectural exteriors, architectural interiors, vehicle interiors, and so on.

The invention claimed is:

1. A matte coating agent, comprising, based on 100 parts by mass of a polyurethane resin:
    1 to 93 parts by mass of resin particles A having a volume average particle diameter $D_A$ of 1 μm or more and less than 5 μm,
    1 to 93 parts by mass of resin particles B having a volume average particle diameter $D_B$ of 5 μm or more and less than 10 μm, and
    1 to 93 parts by mass of resin particles C having a volume average particle diameter $D_C$ of 10 to 20 μm,
    wherein a total content of the resin particles A, the resin particles B, and the resin particles C is 3 to 95 parts by mass based on 100 parts by mass of the polyurethane resin, and
    the resin particles A, the resin particles B, and the resin particles C are each independently resin particles of a urethane resin, an acrylic resin, or a urea resin.

2. The matte coating agent of claim 1, further comprising, based on 100 parts by mass of the polyurethane resin:
    1 to 20 parts by mass of a silica A having a volume average particle diameter of 1 μm or more and less than 5 μm and
    1 to 20 parts by mass of a silica B having a volume average particle diameter of 5 to 15 μm.

3. The matte coating agent of claim 1, wherein the resin particles A, the resin particles B, and the resin particles C are polyurethane resin particles.

4. The matte coating agent of claim 1, further comprising an aqueous solvent.

5. The matte coating agent of claim 1, wherein a ratio $D_A/D_B$ of $D_A$ to $D_B$ is 0.22 to 0.67, and a ratio $D_B/D_C$ of $D_B$ to $D_C$ is 0.33 to 0.75.

6. The matte coating agent of claim 1, wherein $D_A$ is 1.5 to 4.5 μm, and $D_C$ is 12 to 18 μm.

7. The matte coating agent of claim 1, wherein $D_B$ is 6 to 9 μm.

8. The matte coating agent of claim 1, which comprises:
    4 to 70 parts by mass of the resin particles A,
    4 to 70 parts by mass of the resin particles B, and
    4 to 70 parts by mass of the resin particles C, and
    wherein the total content of the resin particles A, the resin particles B, and the resin particles C is 12 to 95 parts by mass based on 100 parts by mass of the polyurethane resin.

9. The matte coating agent of claim 1, which comprises:
    6 to 60 parts by mass of the resin particles A,
    6 to 60 parts by mass of the resin particles B, and
    6 to 30 parts by mass of the resin particles C, and
    wherein the total content of the resin particles A, the resin particles B, and the resin particles C is 18 to 95 parts by mass based on 100 parts by mass of the polyurethane resin.

10. The matte coating agent of claim 9, wherein the resin particles A, the resin particles B, and the resin particles C are polyurethane gel particles.

11. The matte coating agent of claim 9, wherein a ratio $D_A/D_B$ of $D_A$ to $D_B$ is 0.22 to 0.67, and a ratio $D_B/D_C$ of $D_B$ to $D_C$ is 0.33 to 0.75.

12. The matte coating agent of claim 9, wherein $D_A$ is 1.5 to 4.5 μm, and $D_C$ is 12 to 18 μm.

13. The matte coating agent of claim 9, wherein $D_B$ is 6 to 9 μm.

14. The matte coating agent of claim 1, which comprises:
    6 to 18 parts by mass of the resin particles A,
    6 to 18 parts by mass of the resin particles B, and
    6 to 18 parts by mass of the resin particles C, and
    wherein the total content of the resin particles A, the resin particles B, and the resin particles C is 18 to 54 parts by mass based on 100 parts by mass of the polyurethane resin.

15. The matte coating agent of claim 14, which further comprises:
    2 to 10 parts by mass of a silica A having a volume average particle diameter of 1 μm or more and less than 5 μm and
    2 to 10 parts by mass of a silica B having a volume average particle diameter of 5 to 15 μm.

16. The matte coating agent of claim 14, wherein the resin particles A, the resin particles B, and the resin particles C are polyurethane gel particles.

17. The matte coating agent of claim 14, wherein a ratio $D_A/D_B$ of $D_A$ to $D_B$ is 0.22 to 0.67, and a ratio $D_B/D_C$ of $D_B$ to $D_C$ is 0.33 to 0.75.

18. The matte coating agent of claim 14, wherein $D_A$ is 1.5 to 4.5 μm, and $D_C$ is 12 to 18 μm.

19. The matte coating agent of claim 14, wherein $D_B$ is 6 to 9 μm.

20. A skin material, comprising:
    a thermoplastic resin base material having a film comprising the matte coating agent of claim 1.

* * * * *